United States Patent
Yeom

(10) Patent No.: US 6,526,027 B1
(45) Date of Patent: Feb. 25, 2003

(54) BROADCAST SHORT MESSAGE SERVICE EXECUTION METHOD IN A MOBILE COMMUNICATION SYSTEM

(75) Inventor: Jae Sung Yeom, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/216,925

(22) Filed: Dec. 21, 1998

(30) Foreign Application Priority Data

May 4, 1998 (KR) .......................................... 98-16028

(51) Int. Cl.[7] .............................. H04B 1/68; H04B 7/212
(52) U.S. Cl. ...................... 370/312; 370/329; 370/432; 455/434; 455/458; 455/466; 455/515
(58) Field of Search ................................. 370/312, 320, 370/328, 329, 335, 341, 342, 390, 432; 455/422, 434, 450, 458, 466, 507, 509, 515, 517

(56) References Cited

U.S. PATENT DOCUMENTS

| 5,604,921 A | * | 2/1997 | Alanara ........................ 455/45 |
| 5,909,651 A | * | 6/1999 | Chander et al. ............. 455/466 |
| 5,910,949 A | * | 6/1999 | Bilstrom et al. ............ 370/337 |
| 5,930,706 A | * | 7/1999 | Raith .......................... 455/422 |
| 6,175,743 B1 | * | 1/2001 | Alperovich et al. ........ 455/466 |
| 6,252,868 B1 | * | 6/2001 | Diachina et al. ............ 370/347 |

* cited by examiner

Primary Examiner—Alpus H. Hsu
(74) Attorney, Agent, or Firm—Fleshner & Kim, LLP

(57) ABSTRACT

A system and method for managing the communication of information in a mobile network allocates a currently unoccupied, reserve paging channel as a dedicated channel for receiving short message information in a mobile terminal. The method includes determining whether information to be transmitted to the mobile terminal includes short message information or paging information. If the received information includes short message information, a base station transmits reference information to the mobile terminal over a paging channel. The reference information then instructs the mobile terminal to receive the short message over the reserve channel. If the received information includes short message information and paging information, the mobile terminal receives the short message over the reserve channel and then receives the paging information over the paging channel. By receiving short messages over a channel other than the paging channel, load on the paging channel is substantially reduced. Further, the base station may transmit the paging and short message information simultaneously. This improves channel allocation efficiency which, in turn, translates into increased performance of the overall communication system.

25 Claims, 5 Drawing Sheets

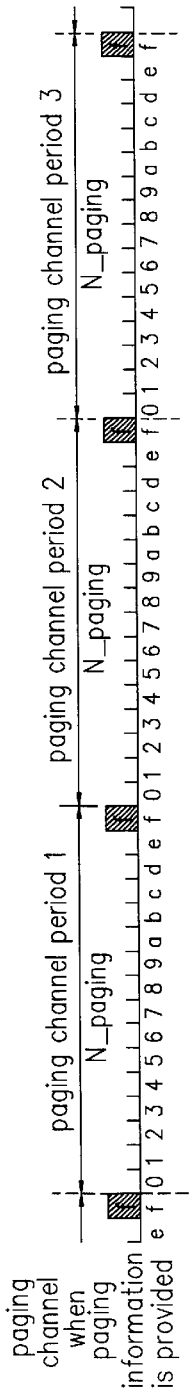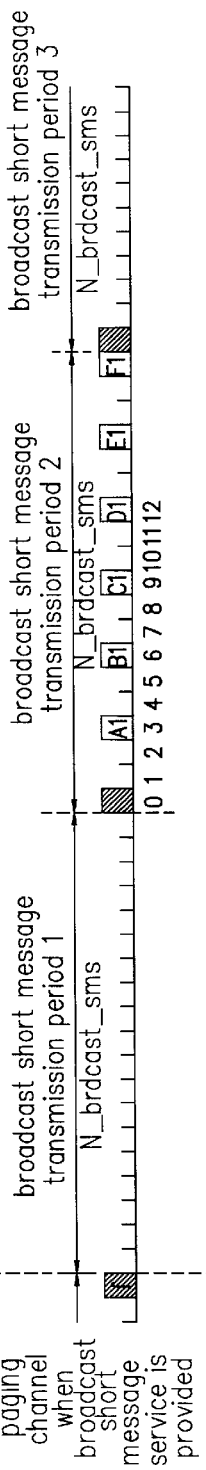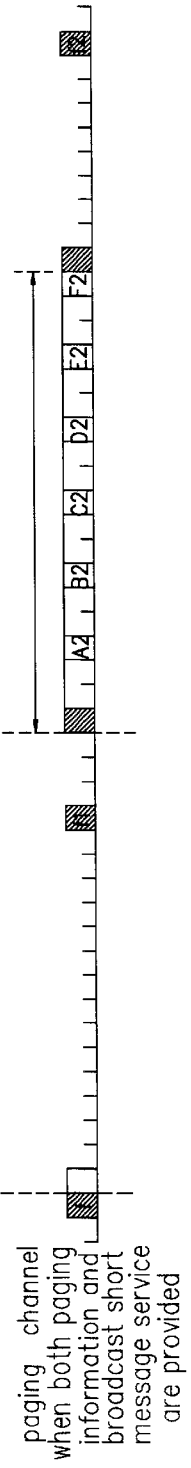

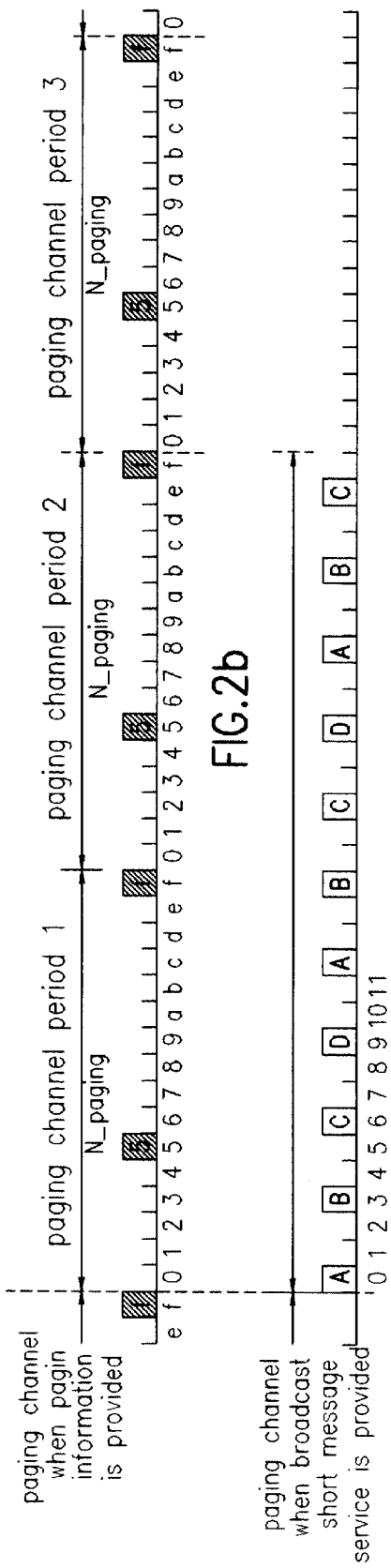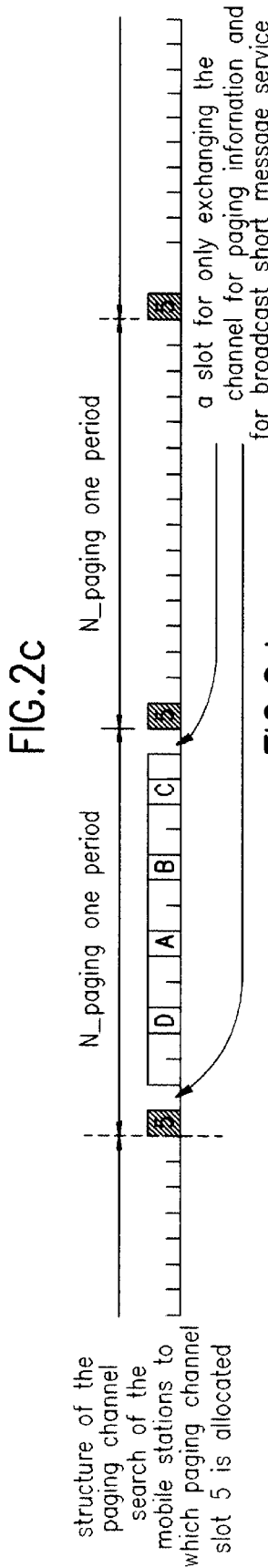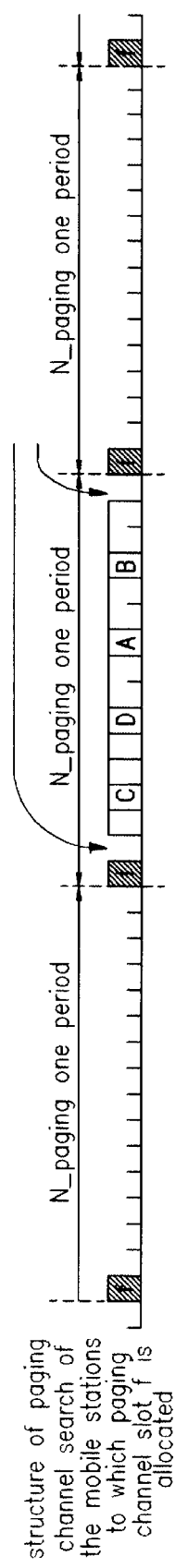

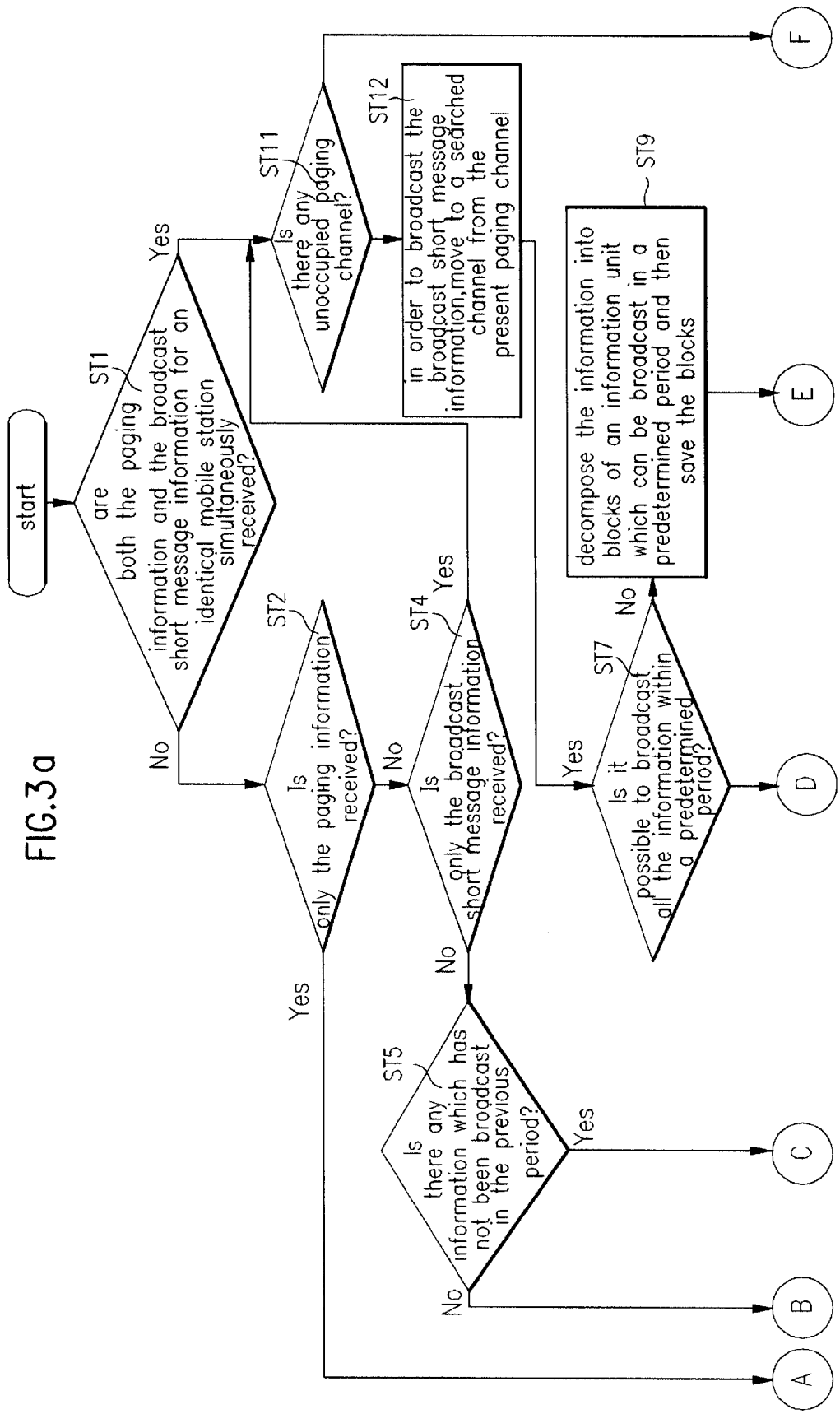

BROADCAST SHORT MESSAGE SERVICE EXECUTION METHOD IN A MOBILE COMMUNICATION SYSTEM

BACKGROUND OF THE INVENTION

1. Field of Invention

The present invention relates to a broadcast short message service(SMS) execution method in a mobile communication system, more particularly, to the method for executing a broadcast short message service so as to distribute effectively the load of paging channels by improving the existing method.

2. Background of the Related Art

Generally, the cellular mobile communication system of code division multiple access(CDMA) has been designed so as to have a flexible signal system and control structure. Therefore, a system expansion is easily made in the mobile communication system and the additional function and capacities in the next generation communication system are achieved. For these purposes, 64 channels are assigned to one FA in a base station of the CDMA cellular mobile communication system. Among the 64 channels, one is assigned to a pilot channel, one is assigned to a synchronization channel, seven channels are assigned to paging channels, and the other channels are assigned to traffic channels. The paging channels deliver the information from a base station to a mobile station by message. There is system information, paging, command, channel assignment, etc., in the important message.

However, in most countries where the CDMA cellular mobile communication system is in use, some of the seven paging channels are used for their most traffic.

Furthermore, every mobile station receives the broadcast short messages concerning with the information about stocks, weather and sports through these paging channels. In other words, a broadcast short message service agent broadcasts various kinds of broadcast short message information to all mobile stations through common paging channels in a predetermined time. Each mobile station selectively receives only the short message information that a mobile station user requests a short message service agent to send. The received information is displayed in the mobile station. Therefore, the short message information about stocks, weather, sports, etc., is periodically provided to the mobile station user through the paging channels.

FIGS. 1a to 1c are the charts showing channel slots of executing a conventional broadcast short message service in a mobile communication system.

Referring to the FIGS. 1a to 1c, the conventional broadcast short message service is provided by one paging channel at the same time as a general paging information.

FIG. 1a shows the slot structure of paging channels whose one period consists of N-paging channel slots (one slot is 80 ms). Each conventional mobile station can repeatedly do the search operation during the paging channel slot time (for example, 80 ms) allocated to itself in each paging period( for example, 5.12 seconds) in order to decide whether or not there is an information for itself. For example, FIG. 1 a is to show that a mobile station allocated to a slot f can do the search operation to verify if there is an information for itself.

On the contrary, FIG. 1b shows the structure of the paging channel slots for the broadcast short message service whose one period is constructed on the N_brdcast_sms paging channel slots(80 ms unit). The period of the paging channel slot of the broadcast short message service consists of N_brdcast_sms slots more than N-paging by three. In other words, as shown in FIG. 1b, the information about the type(A1, B1, C1, D1, E1, F1) and the number of the broadcast short message information is included in the first slot(0) among three slots(0, 1, 2).

Therefore, when the broadcast short message service is provided in a base station and a broadcast short message service agent is requested broadcasting of the broadcast short message information, each base station receives a reference information of the broadcast short message service and repeatedly makes it included in the first slot of the paging channel of each mobile station. The practical short message information(A1–F1) is broadcast just after the reference information has been loaded.

Furthermore, in a single paging channel slot time of a mobile station, both paging information and broadcast short message information may be requested. In this case, the base station gives a priority to the broadcast short message information as shown in FIG. 1c and broadcasts the broadcast short message information (A2–F2) on the preferential basis. The paging information is delayed by one period and then is broadcast in the corresponding slot (f2) in the next period since the current structure of modem chips used in conventional mobile terminals allows that a single mobile station can search only one channel during any special paging channel slot time.

However, when the broadcast short message service is performed in the conventional mobile communication system described above, the CDMA mobile communication system based on the standardization IS-95 cannot have a dedicated channel for the broadcast short message service. Therefore, the broadcast short message service is done by the paging channel. However, this broadcast short message service is performed without difficulties in the early stage in which the number of the mobile communication network subscribers is small. As the number of the subscribers is continually increased and both kinds and broadcasting periods of the broadcast short message services get great varieties, many kinds of problems have come out when essential functions of the paging channels are executed.

When a base station receives both a paging information and a broadcast short message at the same time in one paging channel time for a single mobile station, each base station gives a priority to the broadcast short message information and broadcasts the broadcast short message through the paging channel on the preferential basis. The paging information is delayed by one period and is broadcast in the corresponding paging channel slot time in the next period. Therefore, in the case that both the paging information and the broadcast short message information are simultaneously broadcast in each paging channel slot of a single mobile station, the process load of the paging channel of the base station is increased and the original processing operation of the paging channel information is not achieved effectively and timely. Furthermore, a single mobile station cannot simultaneously process two kinds of information. This problem will get more and more difficult as the number of subscribers who want to use the broadcast short message service is increased.

SUMMARY OF THE INVENTION

Accordingly, the present invention is directed to solve these problems of the conventional techniques and is to provide a broadcast short message service execution and control method which can provide the broadcast short message service by allocating one of the currently unoccupied reserve paging channels to a dedicated channel of the broadcast short message service when the broadcast short message service is executed.

Another object of the present invention is to provide a broadcast short message broadcasting service execution method that when a base station is requested to simultaneously broadcast both the paging information and the broadcast short message information into the paging channel slot of the corresponding mobile terminal, executes first the broadcast short message service by allocating one of the currently unoccupied reserve paging channels to a dedicated channel of the broadcast short message service and then broadcasts the paging information through the original paging channel.

To achieve these and other advantages and in accordance with the purpose of the present invention, as embodied and broadly described, the broadcast short message service execution method in a mobile communication system includes the step of deciding if the received radio signal is the paging information about an arbitrary mobile station, the short message information or the information consisted of both said paging information and said short message information, the step of informing a corresponding mobile station of the reference information for the short message through paging channels when said deciding step indicates that said short message information is received, the step of broadcasting said short message information after moving to one of currently unoccupied paging channels, the step of deciding if the reference information of said short message service is included in said paging information by searching said paging channels by a predetermined period, and according to the presence of the reference information of said short message service, the step of receiving the short message information by moving from said paging channels to the channel which completes the transmission of said short message information.

In the case that both paging information and short message information requested to be transmitted to a single mobile station are simultaneously received, all the steps described above are first executed and then said paging information is broadcast to the corresponding mobile station through said paging channel in the next paging channel period which is allocated to said mobile station.

According to the feature of the present invention, in the case that a broadcast short message information is broadcast from a base station to every mobile station, the existing paging channel is not used for the broadcasting. Instead, one of the currently unoccupied paging channels is assigned to a dedicated channel. Since the broadcast short message information is broadcast to every mobile station through this dedicated channel, the load of the paging channel is effectively distributed and reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 shows a structure of the paging channel slot for a broadcast short message broadcasting service in a conventional mobile communication system.

FIG. 2 shows a structure of the paging channel slot for a broadcast short message broadcasting service in a mobile communication system according to the present invention.

FIGS. 3a and 3b show a flow chart for explaining the operation of base station that broadcasts the paging information or the broadcast short message in the mobile communication system according to the present invention.

DETAILED DESCRIPTION OF THE PREFERRED EMBODIMENT

Figure 3B:
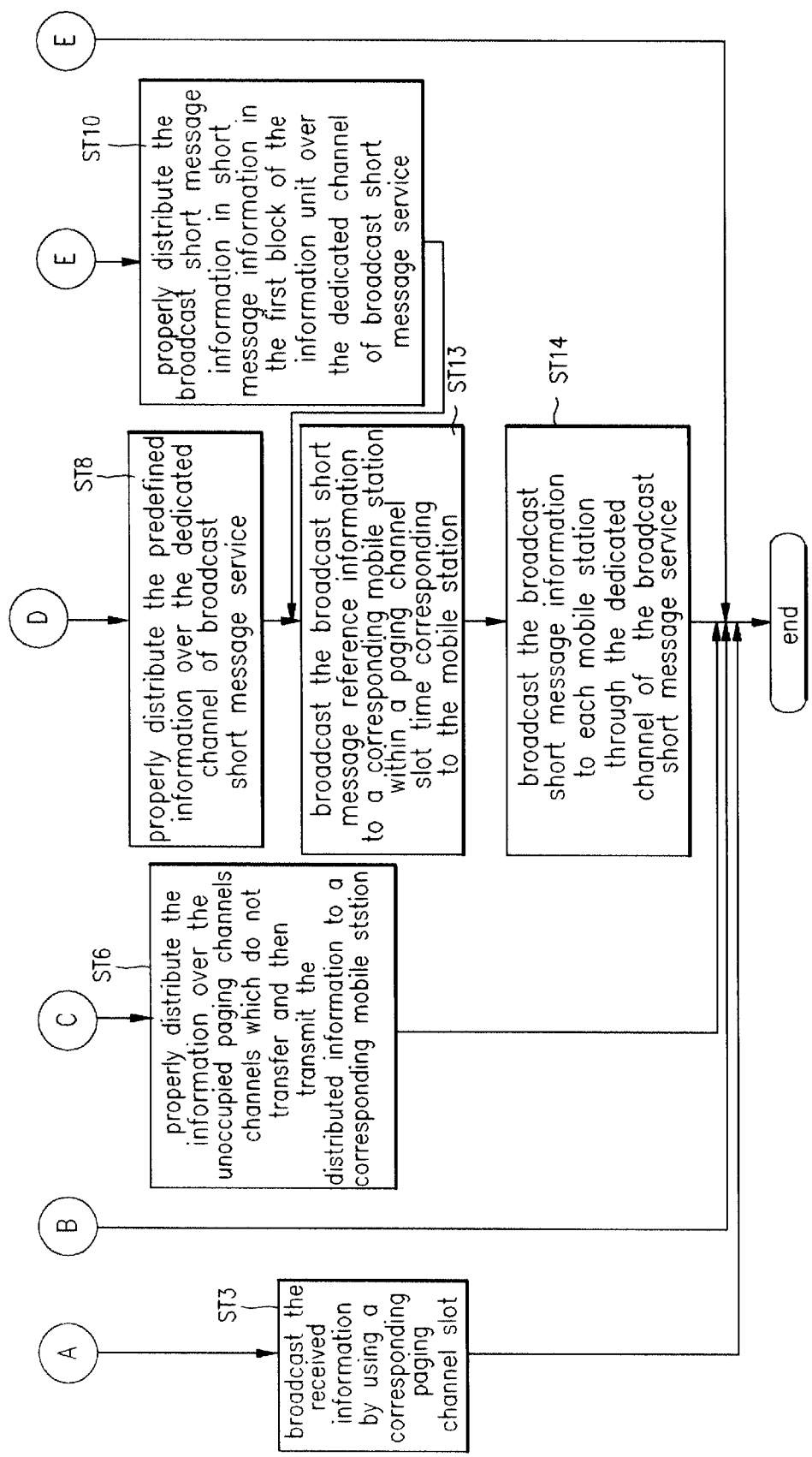

Reference will now be made in detail to the preferred embodiments of the present invention, examples of which are illustrated in the accompanying drawings In one embodiment of the present invention, when the paging information is transmitted through a single paging channel, the operation of every base station and every mobile station is the same as the conventional techniques. As shown in FIG. 2a, in the case that the paging information is transmitted, every base station which receives radio paging information broadcasts the paging information in corresponding paging channel slot time after making a decision on the number of the paging channel slot allocated to a called mobile station.

However, in the case that a broadcast short message information is transmitted, the operation of every base station and mobile station is explained as follows.

First, a base station receives the broadcast short message information which is broadcast by a broadcast short message service agent, broadcasts the broadcast short message service reference information over the paging channel, and searches a currently unoccupied reserve channel. If a currently unoccupied channel is searched, the base station allocates the currently unoccupied channel to a dedicated channel for the broadcast short message service and broadcasts the broadcast short message information over this dedicated channel by making the broadcast short message information included in the first slot of the dedicated slot, as shown in FIG. 2b.

Then, every mobile station searches its own paging channel slot allocated to its paging channel, detects the broadcast short message service reference information and moves to a reserve channel through which the broadcast short message information is already broadcast. After then, the mobile station receives only the short message information that the mobile station requests the broadcast short message service agent.

On the other hand, in the case that both paging information and broadcast short message information are received in a single paging channel slot time and are requested to be simultaneously broadcast to a called terminal, every base station performs the broadcast short message service on the preferential basis and then performs broadcasting the paging information. Therefore, the base station receives the broadcast short message information which is broadcast by the broadcast short message service agent, broadcasts the broadcast short message service reference information through the paging channel of every mobile station, searches a currently unoccupied reserve channel, and allocates the searched reserve channel to a dedicated channel for the broadcast short message service. The broadcast short message information is included in the first slot of the dedicated channel as shown in FIG. 2b and then is broadcast through this dedicated channel. Thereby, the paging information is broadcast through the original paging channel of the mobile station for which said broadcast short message service provided.

In this case, the currently unoccupied paging channel means one of the currently unoccupied paging channels among the seven paging channels which are assigned to a single base station in the CDMA mobile communication system. In the case that this channel is practically selected, a channel having the best state among the currently unoccupied channels and an arbitrary fixed channel may be allocated. The period for the broadcast short message broadcasting information is n times the broadcasting period of said paging information.

Therefore, as shown in FIGS. 2c and 2d, every mobile station searches the paging information which is broadcast during the paging channel slot time allocated to itself. When the broadcast short message service reference information is included, the mobile station moves from the current paging channel to the dedicated channel for the broadcast short message service and receives only the short message information which the mobile station user requests. After then, the mobile station moves from the dedicated channel for the broadcast short message service to the original paging channel and receives the paging information which is broadcast during the next period of the corresponding mobile station.

As shown in FIGS. 2c and 2d, when a movement occurs between the paging channel and the dedicated channel for the broadcast short message service, the slot corresponding to the beginning of the movement is not used because of the time difference.

The broadcast short message service execution method according to the present invention will be explained in detail by referring to FIGS. 3 and 4.

First, as shown in FIG. 3, every base station decides if the paging information and the broadcast short message information about a single mobile station are simultaneously received every period (ST1). If the result of said decision step (ST1) indicates that the paging information and the broadcast short message information about a single mobile station are not simultaneously received, the process goes to the next step for deciding if only paging signal is received (ST2). If the result of the decision step (ST2) indicates that the paging signal is received, the paging information is broadcast to every mobile station through the corresponding paging channel slot (ST3).

On the contrary, the result of said decision step (ST2) indicates no, the decision step for deciding if the broadcast short message information which is broadcast by the short message service agent is received (ST4). If the result of the decision step (ST4) indicates no, every base station decides it there is some information which is not broadcast during the previous paging channel slot (ST5). If there is not any information which is not broadcast during the previous period, the process goes to be terminated. However, if the result of said decision step (ST5) indicates yes, the process goes to the box (ST6) in which the short message information which is not broadcast is properly distributed on the paging channels and then is transmitted to the corresponding mobile station.

On the contrary, if the result of the decision step (ST4) indicates that the broadcast short message information is received, the corresponding base station decides if there is a currently unoccupied paging channel (ST11). If the result of the decision step (ST11) indicates that there is not a currently unoccupied paging channel, the current process goes to be terminated. If the result of the decision step (ST11) indicates that there is a currently unoccupied paging channel, the base station moves from the current paging channel to the searched channel (that is, the dedicated channel for the broadcast short message service) in order to broadcast the broadcast short message information (ST12).

At the same time, if the result of the decision step (ST4) indicates that the broadcast short message information is received, whether or not the received information can be broadcast within the predetermined one period (ST7). If the result of said decision step (ST7) indicates that the received information can be broadcast within the predetermined one period, a currently unoccupied paging channel is searched and is assigned to the dedicated channel of broadcast short message service and the received broadcast short message information is properly distributed on the dedicated channel (ST8).

If the result of said decision step (ST7) indicates that the received information cannot be broadcast within the predetermined one period, every base station decomposes the total information being broadcast into several blocks each of which can be broadcast within the predetermined one period and then stores the blocks (ST9).

Thereafter, every base station properly distributes the broadcast short message information of each block in sequence from the first on the channel for the broadcast short message service (ST10).

After said steps (ST8, ST10), the reference information about the broadcast short message service execution is broadcast to each mobile station in each paging channel slot time corresponding to each mobile station (ST13). Thereafter, the broadcast short message information is transmitted to each mobile station through the dedicated channel for the broadcast short message service (ST14). At this time, the period of the broadcast short message service is n times the broadcasting period of said paging channel information.

However, if the result of the decision step (ST1) indicates that the paging information and the broadcast short message information about a single mobile station are simultaneously received, the corresponding base station decides if there is a currently unoccupied paging channel (ST11). If the result of the decision step (ST11) indicates that there is not a currently unoccupied paging channel, the current process goes to be terminated. If the result of the decision step (ST11) indicates that there is a currently unoccupied paging channel, the base station moves from the current paging channel to the searched channel (that is, the dedicated channel for the broadcast short message service) in order to broadcast the broadcast short message information (ST12). Thereafter, the process goes to the decision step (ST7).

After said steps (ST8, ST10), the reference information about the broadcast short message service execution is broadcast to each mobile station in each paging channel slot time corresponding to each mobile station (ST13). Thereafter, the broadcast short message information is transmitted to each mobile station through the dedicated channel for the broadcast short message service (ST14). At this time, the period of the broadcast short message service is n times the broadcasting period of said paging channel information. After then, every mobile station retrieves the original paging channel, receives the paging information transmitted from the base station and processes the received information.

Figure 4:
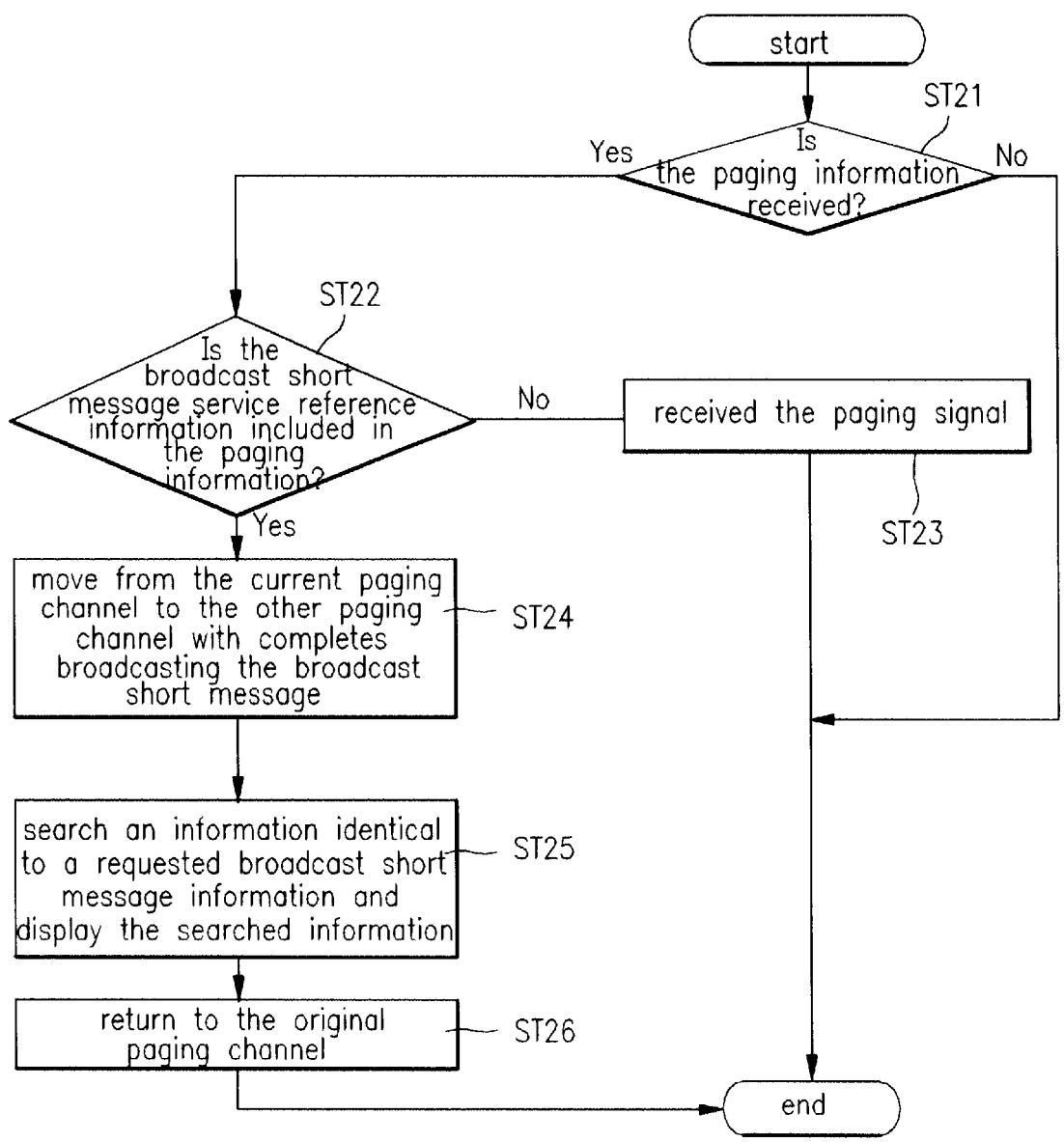
FIG. 4 shows a flow chart for explaining the operation of mobile station that broadcasts the paging information or the broadcast short message in the mobile communication system according to the present invention.

On the contrary, as shown in FIG. 4, every mobile station searches the assigned paging channel at the corresponding paging channel slot time 5 (or f) every period of paging slot whose reference is based on the paging channel slot number assigned to itself and then decides if the paging information is received (ST21). If the result of said decision step (ST21) indicates that the paging information is received, the mobile station decides if the broadcast short message service reference information is included in the received information (ST22). If the result of said decision step (ST22) indicates that the broadcast short message service reference information is not included in the received information, the received information is considered as a general paging information and is processed (ST23).

However, if the result of said decision step (ST22) indicates that the broadcast short message service reference information is included in the received information, every mobile station receives the broadcast short message service reference information, moves from the corresponding paging channel to the dedicated channel for the broadcast short message service (ST24), receives the transmitted broadcast short message information, detects the information which coincides with the broadcast short message information that is previously requested by itself, and then displays the information on the display device installed at the mobile station (ST25). After then, every mobile station moves from the dedicated channel for the broadcast short message service to the original paging channel (ST26).

As explained above, according to the present invention, in the CDMA mobile communication system which is based on the IS-95 standardization and does not separately have a dedicated channel for the broadcast short message service, the currently unoccupied reserve channel is assigned to the dedicated channel for the broadcast short message service. Therefore, since the broadcast short message information is separated from the paging channel and is broadcast to every mobile station when the broadcast short message information is broadcast from a base station, it is possible to effectively distribute and reduce the load of the paging channel. In other words, according to the present invention, since the paging channel for broadcasting the original paging information assigned to a mobile station is different from the dedicated channel of the broadcast short message service for broadcasting the broadcast short message information and therefore the information that the corresponding mobile station receives is neither delayed nor disappeared, a high quality of the communication service as well as a high reliability of the broadcast short message service is provided.

It will be apparent to those skilled in the art that various modifications and variations can be made in the broadcast short message service execution method of the present invention without departing from the spirit or scope of the invention. Thus, it is intended that the present invention covers the modifications and variations of this invention provided they come within the scope of the appended claims and their equivalents.

What is claimed is:

1. A broadcast short message service execution method in CDMA mobile communication system, comprising the steps of:
- (a) deciding if a received radio signal is a paging information about an arbitrary mobile station, a short message information or an information consisting of both said paging information and said short message information;
- (b) informing a corresponding mobile station of a short message reference information through a paging channel when said short message information is received at said decision step (a);
- (c) broadcasting said short message information through an arbitrary channel among currently unoccupied paging channels;
- (d) searching said paging channels every predetermined period and then deciding if said short message information is included in said paging information; and
- (e) moving from said paging channel to the channel by which said short message information is transmitted and then receiving said short message information.

2. The broadcast short message service execution method in CDMA mobile communication system claimed in claim 1, wherein said steps (a), (b) and (c) are executed at every base station and said steps (d) and (e) are executed at a corresponding mobile station.

3. The broadcast short message service execution method in CDMA mobile communication system claimed in claim 1, wherein a step of returning from the channel which completes transmitting said short message to said paging channel is further included after each of the steps (c) and (e).

4. The broadcast short message service execution method in CDMA mobile communication system claimed in claim 1, wherein when only said paging information is received in said step (a), broadcasting to a corresponding mobile station is performed by using the paging channel.

5. The broadcast short message service execution method in CDMA mobile communication system claimed in claim 1, wherein when said paging information and said short message information to be transmitted to a single mobile station are simultaneously received at said step (a), said steps (a) to (e) are executed on the preferential basis and then said paging information is broadcast to the corresponding mobile station through said paging channel in next paging channel period assigned to said mobile station.

6. The broadcast short message service execution method in CDMA mobile communication system claimed in claim 1, wherein said step (c) includes the steps of:
- deciding if said short message information can be broadcast within the predetermined period; and
- broadcasting said short message information when said short message information is completely broadcast within the predetermined period and decomposing the total short message information to be broadcast into blocks so as to be broadcast within a specific period when said short message information is not completely broadcast within the predetermined period.

7. The broadcast short message service execution method in CDMA mobile communication system claimed in claim 6, wherein said decomposed short message information is properly distributed and broadcast in sequence from the first block among said plurality of block units.

8. The broadcast short message service execution method in CDMA mobile communication system claimed in claim 1, wherein at least one paging channel slot which corresponds to the beginning of movement between said paging channel and the channel through which said short message information is transmitted is not used.

9. The broadcast short message service execution method in CDMA mobile communication system claimed in claim 1, wherein said mobile station detects the information coinciding with the previously requested short message information and then displays the information on the display installed at said mobile station.

10. A broadcast short message service execution method in CDMA mobile communication system, comprising the steps of:
- (a1) deciding if a received radio signal is a paging information about an arbitrary mobile station, a short message information or an information consisting of both said paging information and said short message information in which they are simultaneously received;

(b1) informing a corresponding mobile station of a short message reference information through a paging channel when said short message information is received at said decision step (a1);

(c1) assigning one of plurality of paging channels which are provided to said mobile communication system to a dedicated channel for the short message service and then broadcasting said short message information through said dedicated channel;

(d1) searching said paging channel every period which is predetermined and then deciding if said short message information is included in said paging information; and (e1) moving from said paging channel to said dedicated channel and then receiving said short message information.

11. A broadcast short message service execution method in a CDMA mobile communications system, comprising:

deciding a type of information received by a base station;

broadcasting said received information to a mobile station set to receive paging information using a first channel, and wherein when the type of said received information is a short message, said broadcasting step includes broadcasting said short message to said mobile station using a second channel which is a currently unoccupied paging channel; and receiving said short message in said mobile station through the second channel, wherein said broadcasting step includes:
deciding if said short message can completely be broadcast within a predetermined period;
broadcasting said short message when said short message can be completely broadcast within the predetermined period; and
if said short message cannot be completely broadcast within the predetermined period, then partitioning said short message into blocks and broadcasting each of said blocks within a specific period.

12. The broadcast short message service execution method claimed in claim 11, wherein when said base station receives the short message, said broadcasting step includes:

broadcasting reference information from said base station to said mobile station using the first channel which is a paging channel allocated to said mobile station, said reference information being broadcast before said short message is broadcasted to said mobile terminal, wherein said reference information designates the second channel as one which said mobile station is to use for receiving said short message.

13. The broadcast short message service execution method claimed in claim 12, wherein said mobile station detects said reference information from said base station through the first channel which is a paging channel and then receives said short message over the second channel.

14. The broadcast short message service execution method claimed in claim 11, wherein when the broadcast of said short message between said base station and said mobile station is completed, said method further comprises:

setting said base station and said mobile station to respectively transmit and receive subsequent information to be received by said mobile terminal using the first channel.

15. The broadcast short message service execution method claimed in claim 11, further comprising:

broadcasting said blocks of said partitioned short message in sequence.

16. A broadcast short message service execution method in a CDMA mobile communications system, comprising:

deciding a type of information received by a base station;

broadcasting said received information to a mobile station set to receive paging information using a first channel, and wherein when the type of said received information is a short message, said broadcasting step includes broadcasting said short message to said mobile station using a second channel which is a currently unoccupied paging channel; and receiving said short message in said mobile station through the second channel, wherein when said base station and said mobile station move from the first channel to the second channel in order to transmit and receive said short message, at least one paging channel slot that corresponds to a beginning of the movement is not used.

17. The broadcast short message service execution method claimed in claim 11, wherein said mobile station receives said short message, detects information within said short message, and then displays said information on a display of said mobile station.

18. The broadcast short message service execution method in CDMA mobile communication system, comprising the steps of:

(a2) broadcasting a short message service reference information through a paging channel when a paging information and a short message to be transmitted to an identical mobile station are simultaneously transmitted to an arbitrary base station;

(b2) transmitting the short message information through an arbitrary channel among reserve paging channels which are provided for said mobile communication system;

(c2) broadcasting said paging information within the next period of the paging channel slot which is assigned to said mobile station;

(d2) searching the paging channel every paging channel slot which is assigned to itself, moving to the channel through which said short message information is transmitted according to the presence of the short message service reference information, and receiving said short message; and (e2) returning to said paging channel and then receiving a paging signal after said the step (d2) is performed.

19. A method for transmitting information in a mobile communications system, comprising:

storing information indicating that a mobile terminal is to receive paging information over a first channel;

transmitting reference information to said mobile terminal over the first channel, said reference information designating a second channel as one which said mobile station is to use for receiving a short message; and transmitting said short message to said mobile terminal over the second channel in accordance with steps that include:
determining a size of said short message;
if said short message exceeds a predetermined size, then partitioning said short message into a plurality of short-message blocks; and
sequentially transmitting said short-message blocks to said mobile terminal over the second channel.

20. The method as claimed in claim 19, wherein the second channel is an unoccupied paging channel.

21. The method as claimed in claim 19, further comprising:
   transmitting paging information to said mobile terminal over the first channel.

22. The method as claimed in claim 21, wherein said paging information is transmitted to said mobile terminal over the first channel and said short message is transmitted to said mobile terminal over the second channel simultaneously.

23. A broadcast short message service execution method in a CDMA mobile communication system, comprising:
   deciding a type of information received by a base station;
   broadcasting said received information to a mobile station by using a single channel among currently unoccupied paging channels when said type of the received message is a short message; and
   letting said mobile station receive said short message through the channel by which said short message is transmitted,
   wherein the step in which said base station broadcasts said short message information includes:
      deciding if said short message can completely be broadcast within a predetermined period;
      broadcasting said short message when said short message can be completely broadcast within the predetermined period; and
      decomposing the short message, when the short message cannot be completely broadcast within the predetermined period into blocks each of which can be broadcast within a specific period.

24. A broadcast short message service execution method in a CDMA mobile communication system, comprising:
   deciding a type of information received by a base station;
   broadcasting said received information to a mobile station by using a single channel among currently unoccupied paging channels when said type of the received message is a short message; and
   letting said mobile station receive said short message through the channel by which said short message is transmitted,
   wherein when said base station or said mobile station takes a movement over channels in order to transmit or receive said short message, at least one paging channel slot that corresponds to a beginning of the movement is not used.

25. A broadcast short message service execution method in a CDMA mobile communication system, comprising:
   deciding a type of information received by a base station;
   broadcasting said received information to a mobile station by using a single channel among currently unoccupied paging channels when said type of the received message is a short message; and
   letting said mobile station receive said short message through the channel by which said short message is transmitted,
   wherein said mobile station receives said short message, detects information coinciding with said short message that has been previously requested by itself, and displays said information on a display installed at said mobile station.

* * * * *